(12) United States Patent
Banke et al.

(10) Patent No.: US 10,498,841 B2
(45) Date of Patent: Dec. 3, 2019

(54) DETERMINING THE HEALTH OF A NETWORK COMMUNITY

(71) Applicant: International Business Machines Corporation, Armonk, NY (US)

(72) Inventors: Christine A. Banke, Skaneateles, NY (US); Peter J. Fay, Westford, MA (US); Barry A. Feigenbaum, Austin, TX (US); Mary Jo Mueller, Austin, TX (US); Ali Sobhi, Austin, TX (US); Elizabeth V. Woodward, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 918 days.

(21) Appl. No.: 13/927,458

(22) Filed: Jun. 26, 2013

(65) Prior Publication Data

US 2015/0006708 A1    Jan. 1, 2015

(51) Int. Cl.
| | |
|---|---|
| *H04L 29/08* | (2006.01) |
| *G06Q 30/02* | (2012.01) |
| *G06Q 50/00* | (2012.01) |
| *H04W 4/029* | (2018.01) |

(52) U.S. Cl.
CPC .......... *H04L 67/22* (2013.01); *G06Q 30/02* (2013.01); *G06Q 50/01* (2013.01); *H04W 4/029* (2018.02)

(58) Field of Classification Search
CPC ......... G06Q 30/02; H04L 67/22; H04L 67/24; H04L 41/5009; H04L 43/08; G06C 30/02
USPC ....................................................... 709/224
See application file for complete search history.

(56) References Cited

U.S. PATENT DOCUMENTS

| | | | | |
|---|---|---|---|---|
| 2002/0103914 A1* | 8/2002 | Dutta | ...................... | H04L 29/06 709/229 |
| 2007/0239826 A1* | 10/2007 | Ducheneaut | ........... | G06Q 10/10 709/204 |
| 2008/0294760 A1* | 11/2008 | Sampson | ............. | G06Q 10/107 709/223 |
| 2009/0164926 A1 | 6/2009 | Boyle et al. | | |

(Continued)

OTHER PUBLICATIONS

Rabbany, et al. "Social Network Analysis and Mining to Support the Assessment of On-line Student Participation," SIGKDD Explorations, vol. 13, Issue 2, pp. 20-29.

*Primary Examiner* — James E Springer
*Assistant Examiner* — Patrick F Ngankam
(74) *Attorney, Agent, or Firm* — Cantor Colburn LLP; Mercedes Hobson (57) ABSTRACT

Embodiments relate to determining the health of a network community. Aspects include defining, via a computer processor, measurable aspects associated with the network community. The measurable aspects include metrics for one or more of: quantified interactions among users in the network community, quantified activities among the users that are associated with a topic, and quantified activities indicative of network community accessibility. Aspects also include monitoring activities conducted via the network community, collecting data from monitored activities that correspond to the measurable aspects, and analyzing collected data from the monitored activities. The analyzing is performed as a function of the metrics. Aspects further include determining, via the computer processor, a health status of the network community from results of the analyzing.

18 Claims, 4 Drawing Sheets

(56) References Cited

U.S. PATENT DOCUMENTS

| | | | |
|---|---|---|---|
| 2010/0131860 A1 | 5/2010 | DeHaan et al. | |
| 2010/0162135 A1* | 6/2010 | Wanas | G06Q 10/10 715/753 |
| 2010/0185578 A1 | 7/2010 | Chi et al. | |
| 2011/0066459 A1 | 3/2011 | Cheng et al. | |
| 2012/0254405 A1* | 10/2012 | Ganesh | G06Q 30/02 709/224 |
| 2013/0007132 A1* | 1/2013 | Sampson | G06Q 10/10 709/204 |
| 2013/0212479 A1* | 8/2013 | Willis | G06Q 10/10 715/736 |
| 2013/0218669 A1* | 8/2013 | McNulty | G06Q 30/02 705/14.45 |
| 2014/0280624 A1* | 9/2014 | Dillingham | H04L 51/22 709/206 |

\* cited by examiner

FIG. 5

DETERMINING THE HEALTH OF A NETWORK COMMUNITY

BACKGROUND

The present disclosure relates generally to network communities, and more specifically, to determining the health of a network community.

Electronic communication networks are commonly used to generate, acquire, and share information among individuals. Network communities are often developed through one or more platforms that enable individuals with similar interests to communicate with one another. These communications may be social, professional (e.g., collaborative sharing of information within an organization to achieve a target goal, or to market one's skills to a business community), and topical (e.g., based on shared hobbies or interests), to name a few.

Some network communities are considered to be successful, or 'healthy,' based on factors such as growth in the number of members as well as some measure of activity conducted in the community. Similarly, other network communities do not fare as well based on factors such as stagnant growth in membership and/or reduced activities conducted in the community. Understanding the health of a network community, as well as changes thereto, could provide valuable information to a wide variety of principals who may have differing vested interests in the community.

BRIEF SUMMARY

Embodiments include a method, system, and computer program product for determining the health of a network community.

A method includes defining, via a computer processor, measurable aspects associated with the network community. The measurable aspects include metrics for one or more of: quantified interactions among users in the network community, quantified activities among the users that are associated with a topic, and quantified activities indicative of network community accessibility. The method also includes monitoring activities conducted via the network community, collecting data from monitored activities that correspond to the measurable aspects, and analyzing collected data from the monitored activities. The analyzing is performed as a function of the metrics. The method also includes determining, via the computer processor, a health status of the network community from results of the analyzing.

A system includes a computer processor and logic executable by the computer processor. The logic is configured to implement a method. The method includes defining measurable aspects associated with the network community. The measurable aspects include metrics for one or more of: quantified interactions among users in the network community, quantified activities among the users that are associated with a topic, and quantified activities indicative of network community accessibility. The method also includes monitoring activities conducted via the network community, collecting data from monitored activities that correspond to the measurable aspects, and analyzing collected data from the monitored activities. The analyzing is performed as a function of the metrics. The method further includes determining, via the computer processor, a health status of the network community from results of the analyzing.

A computer program product includes a computer readable storage medium having program code embodied therewith. The program code is executable by a computer processor to implement a method. The method includes defining measurable aspects associated with the network community. The measurable aspects include metrics for one or more of: quantified interactions among users in the network community, quantified activities among the users that are associated with a topic, and quantified activities indicative of network community accessibility. The method also includes monitoring activities conducted via the network community, collecting data from monitored activities that correspond to the measurable aspects, and analyzing collected data from the monitored activities. The analyzing is performed as a function of the metrics. The method further includes determining a health status of the network community from results of the analyzing.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to determining the health of a network community. The network community health processes collect and analyze a variety of data based on particular factors of interest concerning the network community to derive an indication of its current health. In particular, the network community health processes evaluates the health of the network community by focusing on information, such as the types of interaction between community members, the levels of activity of the members, and the overall inclusiveness of the community. This information can provide valuable guidance to various parties who may have an interest in the network community (e.g., for a prospective member who is considering whether to join the community, for an administrator of the network community, for current or prospective advertisers, and for a service provider or owner of the network community, to name a few).

For example, from a personal productivity perspective, determining which of a group of network communities or social networks are most active may be useful in rendering a decision on which network community to join. Existing methods of making this determination typically involve individually accessing each network community and performing a visual inspection. In addition, from a business perspective, it would be helpful for investors to acquire information that will assist in determining which communities are worth investing in. For example, if a business is spending a fixed amount of money per person for a license to participate in a social network tool, they may want to know how much value the tool is providing.

From a community administrator perspective, it can be difficult to determine the health of a community and to identify where improvements can be made or to determine the impact of changes in the community. For example, without significant effort, it may not be obvious that, while there are 1,000 messages posted in a forum, only five people have primarily contributed to the posts. Or, alternatively, it may not be obvious that, although 100 people have participated in that community, the rate of participation has steadily declined.

The exemplary network community health processes provide improved mechanisms by which one can determine the health of a social network or network community. In addition, the exemplary network community health processes provide a mechanism for enabling users to search for social networks or communities based on the health rating of the communities. In an embodiment, the network community health processes provides a mechanism for using the rating information to create a 'seal of approval' or indicator that can be posted to communities as a visual indicator of their vibrancy.

Figure 1:
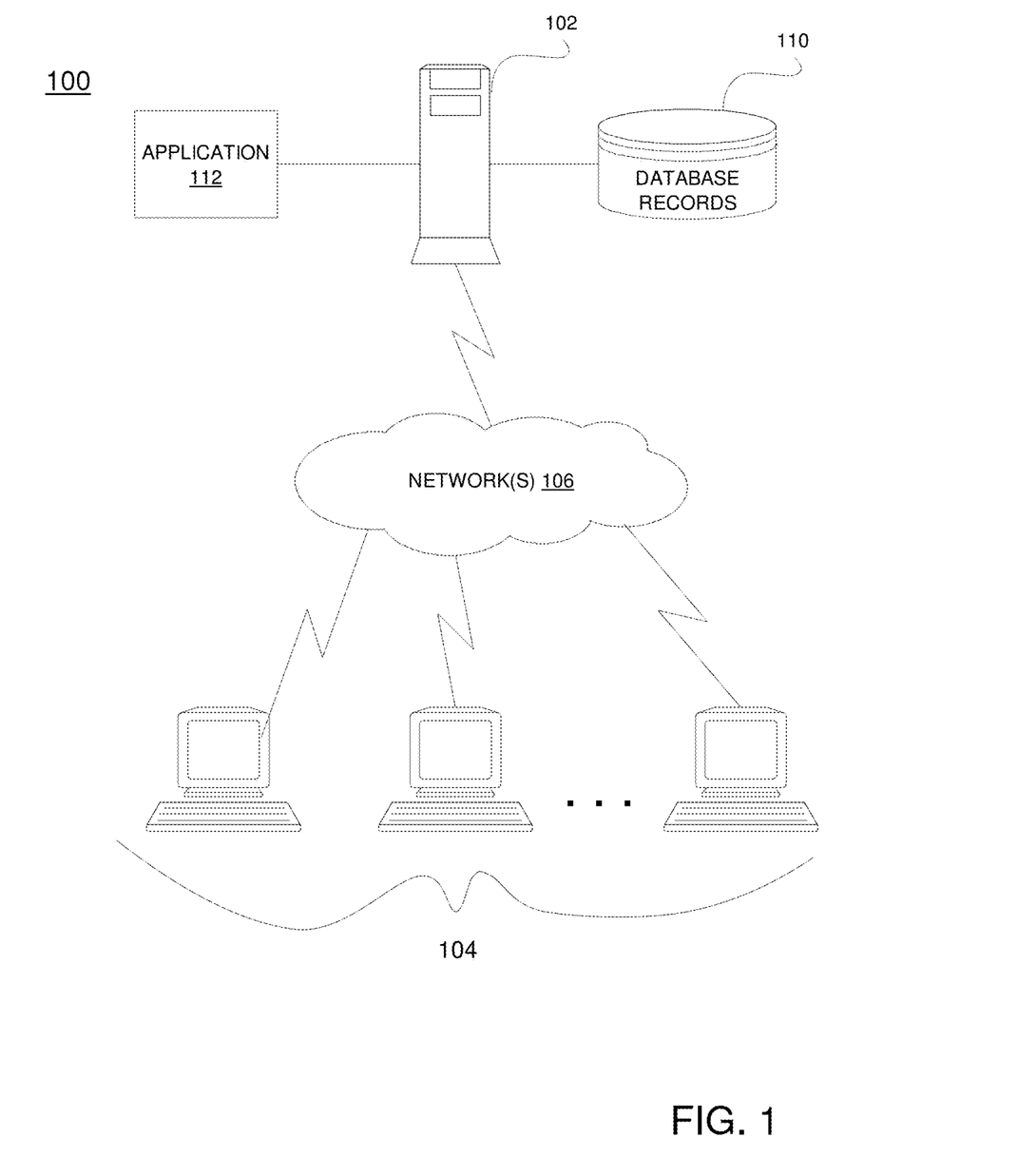
FIG. 1 depicts a system upon which network community health processes may be implemented in accordance with an embodiment.

Turning now to FIG. 1, a system 100 upon which the network community health processes may be implemented in an embodiment will now be described.

Figure 3:
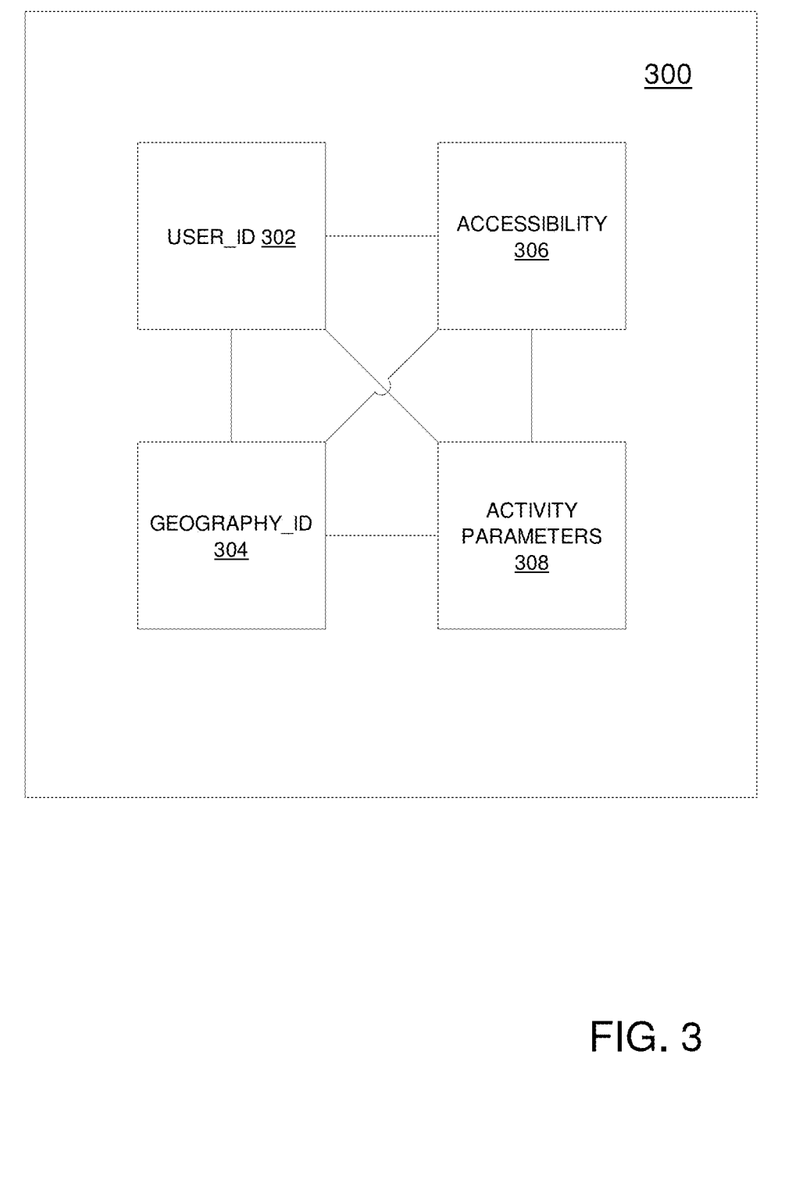
FIG. 3 depicts a database structure for processing data collected in determining the health of a network community in accordance with an embodiment.

The system 100 includes a host system computer 102 and communications devices 104 (also referred to as user systems) communicatively coupled to one or more network(s) 106. The host system computer 102 may be implemented as one or more high-speed computer processing devices, such as one or more mainframe computers or servers capable of handling a high volume of computing activities conducted by users of the network community health processes. The host system computer 102 may operate as a database server and coordinate access to application data including data stored on a storage device 110. The storage device 110 may be implemented using memory contained in the host system computer 102 or may be a separate physical device. In an embodiment, the storage device 110 stores database records of data collected by the network community health processes (sample database records are shown in FIG. 3).

The host system computer 102 may be implemented using one or more servers operating in response to a computer program stored in a storage medium accessible by the server. The host system computer 102 may also operate as a network server (e.g., a web server) to communicate with the communications devices 104, as well as any other network entities. In an embodiment, the host system computer 102 may represent a node in a cloud computing environment or may be configured to operate in a client/server architecture.

The communications devices 104 may be any type of devices with computer processing capabilities. For example, the communications devices 104 may include a combination of general-purpose computers (e.g., desktop, lap top), host-attached terminals (e.g., thin clients), and portable communication devices (e.g., smart phones, personal digital assistants, and tablet PCs). The communications devices 104 may be wired or wireless devices. In an embodiment, the communications devices 104 may represent cloud consumers in a cloud computing environment.

In an embodiment, the communications devices 104 may be implemented by users of a network community hosted by a corresponding entity or enterprise operating the host system computer 102. The communications devices 104 may each execute a web browser for accessing network entities, such as the host system computer 102. In one embodiment, the communications devices 104 access a web site of the host system computer 102 for browsing and posting and accessing content with respect to the network community. An application 112 executable by the host system computer 102 monitors network community activities and implements the network community health processes described herein.

In addition, the communications devices 104 may be operated by administrators of the network community or other individuals who may be stakeholders in the network community.

The network(s) 106 may be any type of known networks including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art, e.g., using cellular, satellite, and/or terrestrial network technologies.

Figure 2:
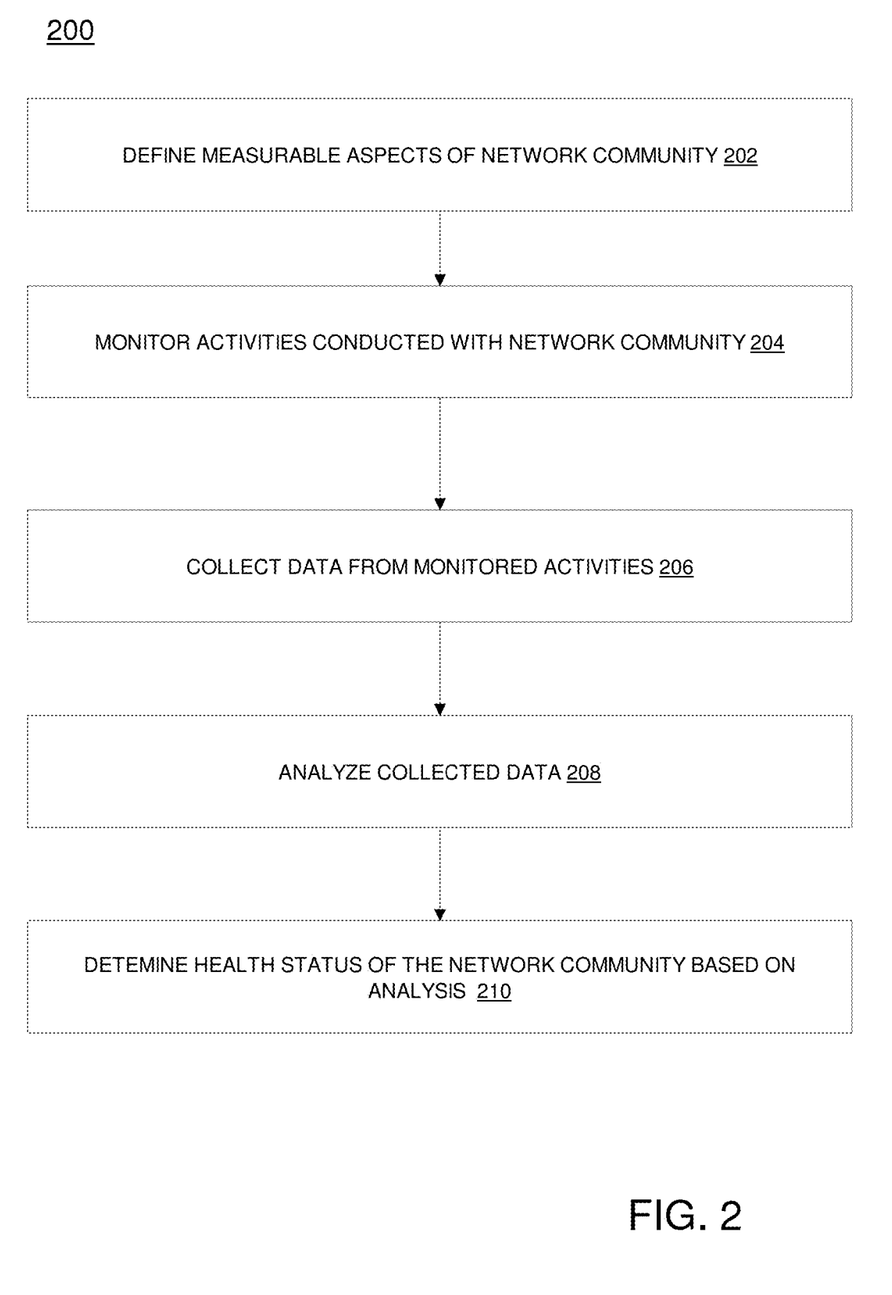
FIG. 2 depicts a flow diagram of a process for determining the health of a network community in accordance with an embodiment.

Turning now to FIG. 2, a flow diagram of a process 200 in accordance with an embodiment is generally shown. The process 200 of FIG. 2 assumes that a user of a communications device (also referred to herein as "user system") is an administrator or authorized individual of the host system computer 102.

At step 202, measurable aspects associated with the network community are defined via the application 112. The measurable aspects include metrics for one or more of quantified interactions among users in the network community, quantified activities among the users that are associated with a topic, and quantified activities indicative of network community accessibility.

The metrics for the quantified interactions among the users and activities associated with a topic may include a percentage of the users who communicate with one another outside of a context of an expected norm. The expected norm may be derived from distinguishing communications content from patterns associated with previously monitored communications between corresponding users. The metrics may also include a percentage of the users who communicate with one another about the topic that is subject to the network community. The percentage of users who communicate with one another about the topic subject to the network community may be derived from identifying patterns of matching content to the topic of the network community. The metrics may also include a percentage of the users who post content on other users blogs. The metrics may also include a frequency in which the users communicate with one another outside of a context of an expected norm. The expected norm may be derived from distinguishing communications content from patterns associated with previously monitored communications between corresponding users. The metrics may also include a frequency in which the users communicate with one another about a topic that is subject to the network community. The percentage of users who communicate with one another about a topic subject to the network community may be derived from identifying patterns of matching content to the topic of the network community.

In an embodiment, the metrics for the quantified activities indicative of network community accessibility include one or more of: a percentage of content in the network community that is accessible to disabled users, a percentage of content in the network community that is accessible to disabled users broken down by disability types (e.g., the disability types may include one or more of blindness, reduced vision, deafness, and reduced hearing), a percentage of participation in the network community from targeted entities of an organizational chart (e.g., business unit, brand, and role), and a percentage of participation from users residing in targeted geographies.

Returning now to FIG. 2, at step 204, the application 112 monitors activities conducted via the network community, such as chat messages, blog postings, page views, link accesses, etc. The monitoring includes identifying words, phrases, or other indicia that can be examined and analyzed for pattern recognition. The monitoring may also include identifying the users of the network communities themselves (e.g., through account information). The monitoring may further include identifying a geographic location of the users (e.g., through account information or posted content). It will be understood that the above types of data subject to the monitoring are presented here for illustrative purposes and are not to be construed as limiting in scope.

At step 206, the application 112 collects the data from monitored activities that correspond to the measurable aspects. The data is collected over a period of time such that it can be compared with previously collected data in order to identify any trends, such as changes in membership to the network community.

Various database records of data collected may be stored in the storage device 110 in FIG. 1. Sample records are shown in FIG. 3 and include user ID records 302 for each of the members of the network community, geographic records 304 indicating a location or geographic residence of the members of the network community, accessibility records 306 that store parameters used in determining accessibility of the network community, and activity data records 308 that store collected data and patterns identified from processing the data. It will be understood that any addition (or fewer) database records may be used by the network community health processes in order to realize the advantages of the embodiments described herein.

Returning to FIG. 2, at step 208, the application 112 analyzes the collected data from the monitored activities. The analyses are performed as a function of the metrics. For example, the metrics may provide that data of interest is to be represented in terms of percentages of users associated with an activity, frequency of an occurrence of activity, or other unit of measure.

At step 210, the application 112 determines a health status of the network community from results of the analyzing. In one embodiment, the percentage values described above in step 202 may be 'rolled up' or aggregated to determine a total percentage of the users who relate to one another. In particular, the total percentage may be determined by aggregating the percentage of the users who communicate with one another outside of a context of an expected norm, the percentage of the users who communicate with one another about the topic that is subject to the network community, and the percentage of the users who post content on other users blogs.

In a further embodiment, the health status of the network community can be determined from the analyzing by aggregating, as an overall frequency of communication among the users, the frequency in which the users communicate with one another outside of a context of an expected norm, and the frequency in which the users communicate with one another about a topic that is subject to the network community.

Any one or more of the metrics can be weighted in order to further define a health status. For example, a percentage of users who communicate with one another about a topic associated with the community may be weighted higher than a weight value for a percentage of users who communicate with one another about a topic that is outside of the scope of the community's purpose.

In an embodiment, determining the health status may include classifying the health status according to threshold values derived from the results of the analyzing (e.g., threshold values of good, fair, and poor). For example, the application 112 may determine a rating (e.g., good) from when a health status indicates or exceeds a defined threshold value (e.g., above 70% health indicates 'good' health). In this embodiment, the rating may be displayed on the web site of the network community or may be available for viewing by a limited subset of individuals based on predefined rules. For example, the rating may be available to a network administrator but not to the members of the network community. Similarly, if the rating is available for viewing by the members, or even the public in general (e.g., nonmembers), the application 112 may be configured to allow the public to search for communities based on this rating.

Figure 4:
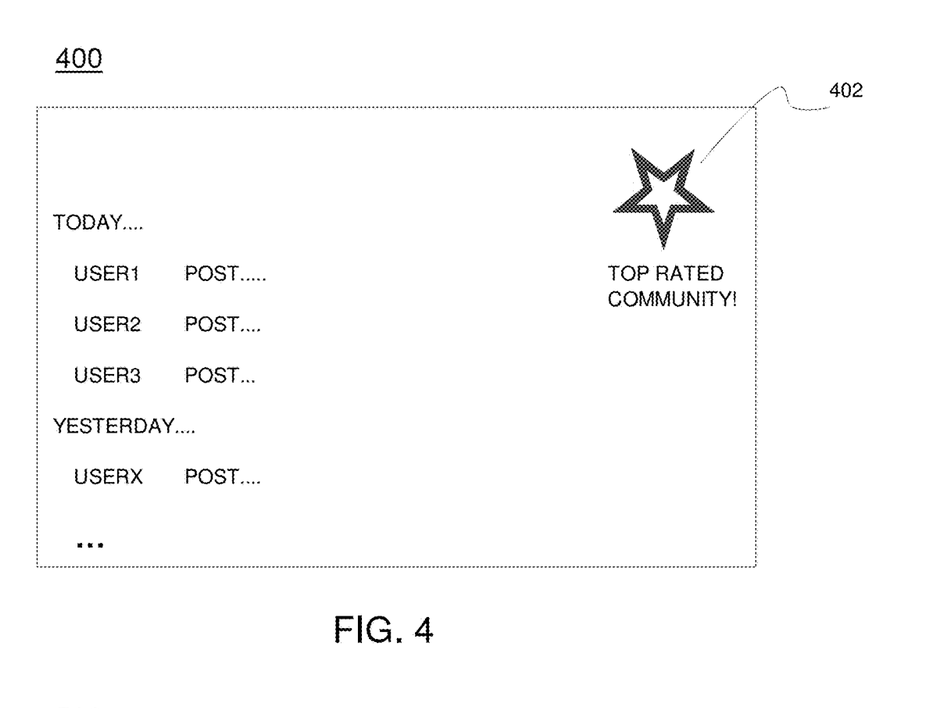
FIG. 4 depicts a user interface screen as seen by a user of the network community health processes in accordance with an embodiment.

As shown in FIG. 4 by way of non-limiting example, a user interface screen 400 illustrates a web site of the network community and rating 402.

Figure 5:
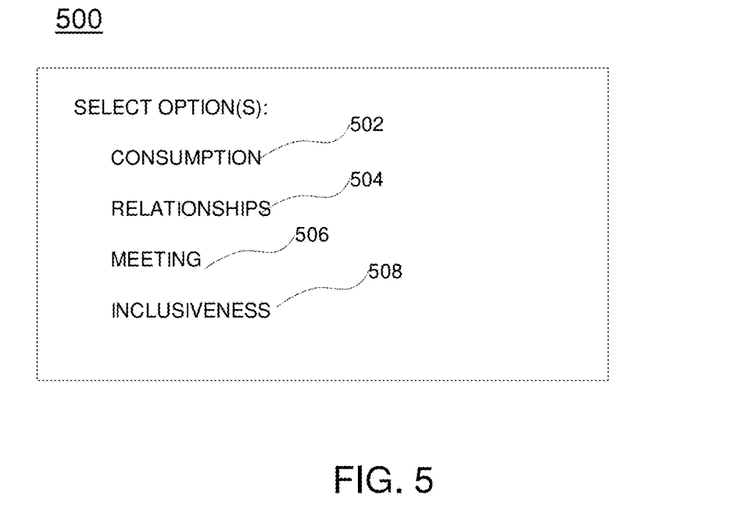
FIG. 5 depicts a user interface for selecting options used in implementing the network community health processes in accordance with an embodiment.

In an embodiment, the application 112 may further be configured to enable individuals to select options associated with the measurable aspects described above. A sample user interface screen 500 in FIG. 5 illustrates this feature. As shown in FIG. 5, by way of illustration, options 502, 504, 506, and 508 correspond to the measurable aspects described in step 202 above. Option 502 is directed to measurable aspects relating to content consumption by network community users. For example, the measurable aspects may include a percentage of total possible participants (e.g., 3,800 members out of a possible 35,000).

Option 504 is directed to measurable aspects concerning relationships among community members. There are several measurable aspects available for selection, as described above in step 202 of FIG. 2.

Option 506 is directed to measurable aspects concerning meeting health. The measurable aspects may include a percentage of invited members for an electronic meeting who attend (e.g., from collected data associated with a user calendar in combination with a tool that polls members for attendance). The measurable aspects may also include a percentage of invitees who actively participate in meetings over time (e.g., as determined by viewing the number of times a member spoke in a VoIP call or chatted using a chat tool during a meeting). By integrating the system with an email/calendaring server and scanning messages, the application 112 may also determine the percentage of participants who forward email about community meetings in whole or in part to others.

Once one or options have been selected, the application 112 is configured to collect data associated with activities directed to those associated with the selected option. Thus, the nature of the data collected may be customized for different individuals.

Technical effects and benefits include network community health processes for providing improved mechanisms by which one can determine the health of a social network or network community. In addition, the exemplary network community health processes provide a mechanism for enabling users to search for social networks or communities based on the health rating of the communities. In an embodiment, the network community health processes provides a mechanism for using the rating information to create a 'seal of approval' or indicator that can be posted to communities as a visual indicator of their vibrancy.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
  defining, via a computer processor, measurable aspects associated with a network community, the measurable aspects include metrics for:
    quantified activities indicative of network community accessibility, wherein quantified activities indicative of network community accessibility comprise:
      a percentage of content in the network community that is accessible to disabled users, and
        a percentage of participation in the network community from targeted entities of an organization chart including at least one of business unit, brand, and roles;
    quantified activities based upon a percentage of total possible participation within the network community,
    quantified interactions among users in the network community, wherein the quantified interactions include a frequency in which users communicate with one another outside of a context of an expected norm, the expected norm derived from distinguishing communications content from patterns associated with previously monitored communications between corresponding users,
    quantified activities among the users that are associated with a topic, and
    meeting health in the network community,
      a percentage of invitees who actively participate in meetings over time, wherein the percentage of invitees who actively participate in meetings over time is determined by analyzing a number of times an invitee spoke in a voice over internet protocol (VOIP) call; and
      a percentage of participants who forward emails about meetings to others;
  monitoring activities conducted via the network community;
  collecting data from monitored activities that correspond to the measurable aspects;
  analyzing collected data from the monitored activities, the analyzing performed as a function of the metrics;
  determining, via the computer processor, a health status of the network community based upon results of the analyzing, wherein the determining the health status of the network community includes classifying the health status according to threshold values derived from results of the analyzing;
  determining a rating from one of the threshold values reflecting the health status; and
  providing the rating to at least one of:
    an advertiser for the network community;
    a service provider for the network community;
    an administrator of the network community; and
    a prospective member of the network community.

2. The method of claim 1, further comprising:
  providing, via the computer processor, user-selectable options associated with the measurable aspects; and
  receiving a selection of at least one of the options;
  wherein the collecting data from the monitored activities includes collecting data associated with activities corresponding to the selection.

3. The method of claim 1, wherein the metrics for the quantified interactions among the users and the metrics for the quantified activities among the users that are associated with a topic include:
  a percentage of the users who communicate with one another outside of a context of an expected norm, the expected norm derived from distinguishing communications content from patterns associated with previously monitored communications between corresponding users;
  a percentage of the users who communicate with one another about the topic that is subject to the network community, the percentage of users who communicate with one another about the topic subject to the network community is derived from identifying patterns of matching content to the topic of the network community;
  a percentage of the users who post content on other users blogs;
  a frequency in which the users communicate with one another about a topic that is subject to the network community, the percentage of users who communicate with one another about a topic subject to the network community is derived from identifying patterns of matching content to the topic of the network community.

4. The method of claim 3, further comprising:
  determining a total percentage of the users who relate to one another, the total percentage determined by aggregating the percentage of the users who communicate with one another outside of a context of an expected norm, the percentage of the users who communicate with one another about the topic that is subject to the network community, and the percentage of the users who post content on other users blogs.

5. The method of claim 3, further comprising:
  determining an overall frequency of communication among the users, the overall frequency of communication determined by aggregating the frequency in which the users communicate with one another outside of a context of an expected norm, and the frequency in which the users communicate with one another about a topic that is subject to the network community.

6. The method of claim 1, wherein the metrics for the quantified activities indicative of network community accessibility include a percentage of participation from users residing in targeted geographies and
  a percentage of content in the network community that is accessible to disabled users broken down by disability types, the disability types including at least one of blindness, reduced vision, deafness, and reduced hearing.

7. The method of claim 1, further comprising:
setting accessibility for controlling a view of the rating based on a user status.

8. A system, comprising:
a computer processor; and
logic, stored in a non-transitory computer readable medium, executable by the computer processor, the logic configured to implement a method, the method comprising:
defining measurable aspects associated with a network community, the measurable aspects include metrics for:
quantified activities indicative of network community accessibility, wherein quantified activities indicative of network community accessibility comprise:
a percentage of content in the network community that is accessible to disabled users, and
a percentage of participation in the network community from targeted entities of an organization chart including at least one of business unit, brand, and roles,
quantified activities based upon a percentage of total possible participation within the network community, and
the measurable aspects including metrics for at least one of:
quantified interactions among users in the network community, wherein the quantified interactions include a frequency in which users communicate with one another outside of a context of an expected norm, the expected norm derived from distinguishing communications content from patterns associated with previously monitored communications between corresponding users,
quantified activities among the users that are associated with a topic, and
meeting health in the network community, wherein the measurable aspects includes a percentage of invitees who actively participate in meetings over time, wherein the percentage of invitees who actively participate in meetings over time is determined by analyzing a number of times an invitee spoke in a voice over internet protocol (VOIP) call; and
wherein the measurable aspects includes a percentage of participants who forward emails about meetings to others;
monitoring activities conducted via the network community;
collecting data from monitored activities that correspond to the measurable aspects;
analyzing collected data from the monitored activities, the analyzing performed as a function of the metrics; and
determining a health status of the network community based upon results of the analyzing, wherein the determining the health status of the network community includes classifying the health status according to threshold values derived from results of the analyzing;
determining a rating from one of the threshold values reflecting the health status; and
providing the rating to at least one of:
an advertiser for the network community;
a service provider for the network community;
an administrator of the network community; and
a prospective member of the network community.

9. The system of claim 8, wherein the logic is further configured to implement:
providing user-selectable options associated with the measurable aspects; and
receiving a selection of at least one of the options;
wherein the collecting data from the monitored activities includes collecting data associated with activities corresponding to the selection.

10. The system of claim 8, wherein the metrics for the quantified interactions among the users and the metrics for the quantified activities among the users that are associated with a topic include:
a percentage of the users who communicate with one another outside of a context of an expected norm, the expected norm derived from distinguishing communications content from patterns associated with previously monitored communications between corresponding users;
a percentage of the users who communicate with one another about the topic that is subject to the network community, the percentage of users who communicate with one another about the topic subject to the network community is derived from identifying patterns of matching content to the topic of the network community;
a percentage of the users who post content on other users blogs;
a frequency in which the users communicate with one another about a topic that is subject to the network community, the percentage of users who communicate with one another about a topic subject to the network community is derived from identifying patterns of matching content to the topic of the network community.

11. The system of claim 10, wherein the logic is further configured to implement:
determining a total percentage of the users who relate to one another, the total percentage determined by aggregating the percentage of the users who communicate with one another outside of a context of an expected norm, the percentage of the users who communicate with one another about the topic that is subject to the network community, and the percentage of the users who post content on other users blogs.

12. The system of claim 10, wherein the logic is further configured to implement:
determining an overall frequency of communication among the users, the overall frequency of communication determined by aggregating the frequency in which the users communicate with one another outside of a context of an expected norm, and the frequency in which the users communicate with one another about a topic that is subject to the network community.

13. The system of claim 8, wherein the metrics for the quantified activities indicative of network community accessibility include a percentage of participation from users residing in targeted geographies and
a percentage of content in the network community that is accessible to disabled users;
a percentage of content in the network community that is accessible to disabled users broken down by disability types, the disability types including at least one of blindness, reduced vision, deafness, and reduced hearing.

14. The system of claim 8, wherein the logic is further configured to implement:
setting accessibility for controlling a view of the rating based on a user status.

15. A computer program product, comprising:
a non-transitory computer readable storage medium having program code embodied therewith, the program code executable by a computer processor to implement a method, the method comprising:

defining measurable aspects associated with a network community, the measurable aspects include:

quantified activities indicative of network community accessibility, wherein quantified activities indicative of network community accessibility comprise:
a percentage of content in the network community that is accessible to disabled users, and
a percentage of participation in the network community from targeted entities of an organization chart including at least one business unit, brand, and roles, quantified activities based upon a percentage of total possible participation within the network community, and the measurable aspects including metrics for at least one of:
quantified interactions among users in the network community, wherein the quantified interactions include a frequency in which users communicate with one another outside of a context of an expected norm, the expected norm derived from distinguishing communications content from patterns associated with previously monitored communications between corresponding users,
quantified activities among the users that are associated with a topic, and
meeting health in the network community, wherein the measurable aspects includes a percentage of invitees who actively participate in meetings over time, wherein the percentage of invitees who actively participate in meetings over time is determined by analyzing a number of times an invitee spoke in a voice over internet protocol (VOIP) call; and
wherein the measurable aspects includes a percentage of participants who forward emails about meetings to others;

monitoring activities conducted via the network community;

collecting data from monitored activities that correspond to the measurable aspects;

analyzing collected data from the monitored activities, the analyzing performed as a function of the metrics; and determining a health status of the network community based upon results of the analyzing, wherein the determining the health status of the network community includes classifying the health status according to threshold values derived from results of the analyzing;

determining a rating from one of the threshold values reflecting the health status; and providing the rating to at least one of:
an advertiser for the network community;
a service provider for the network community;
an administrator of the network community; and
a prospective member of the network community.

16. The computer program product of claim 15, wherein the program code is further executable by the computer processor to implement:
providing user-selectable options associated with the measurable aspects; and
receiving a selection of at least one of the options;
wherein the collecting data from the monitored activities includes collecting data associated with activities corresponding to the selection.

17. The computer program product of claim 15, wherein the metrics for the quantified interactions among the users and the metrics for the quantified activities among the users that are associated with a topic include:
a percentage of the users who communicate with one another outside of a context of an expected norm, the expected norm derived from distinguishing communications content from patterns associated with previously monitored communications between corresponding users;
a percentage of the users who communicate with one another about the topic that is subject to the network community, the percentage of users who communicate with one another about the topic subject to the network community is derived from identifying patterns of matching content to the topic of the network community;
a percentage of the users who post content on other users blogs;
a frequency in which the users communicate with one another about a topic that is subject to the network community, the percentage of users who communicate with one another about a topic subject to the network community is derived from identifying patterns of matching content to the topic of the network community.

18. The computer program product of claim 17, wherein the program code is further executable by the computer processor to implement:
determining a total percentage of the users who relate to one another, the total percentage determined by aggregating the percentage of the users who communicate with one another outside of a context of an expected norm, the percentage of the users who communicate with one another about the topic that is subject to the network community, and the percentage of the users who post content on other users blogs.

* * * * *